Figure 1:
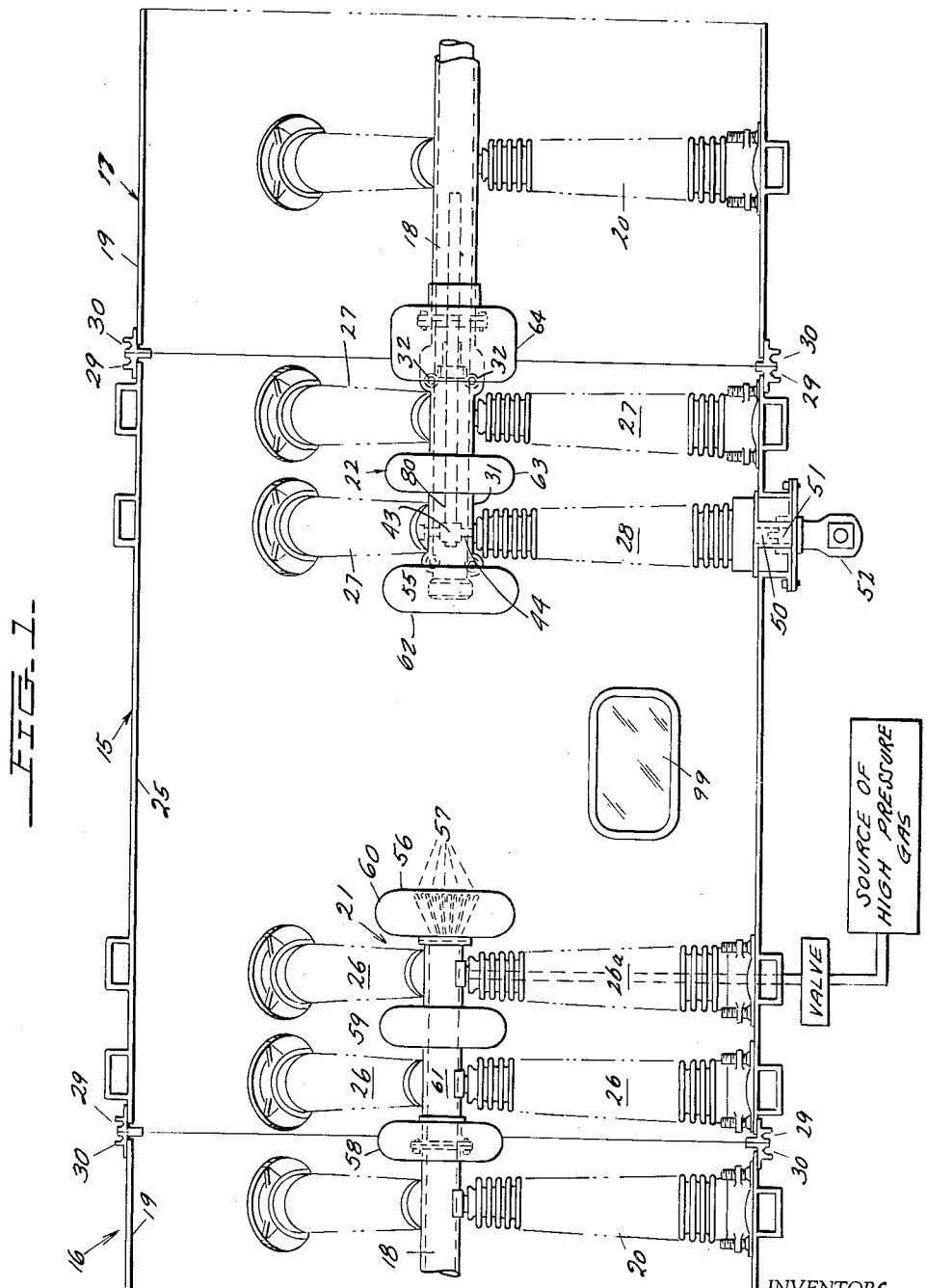

INVENTORS
ARTHUR C. BATES
ROBERT C. CROWE
BY
ATTORNEYS

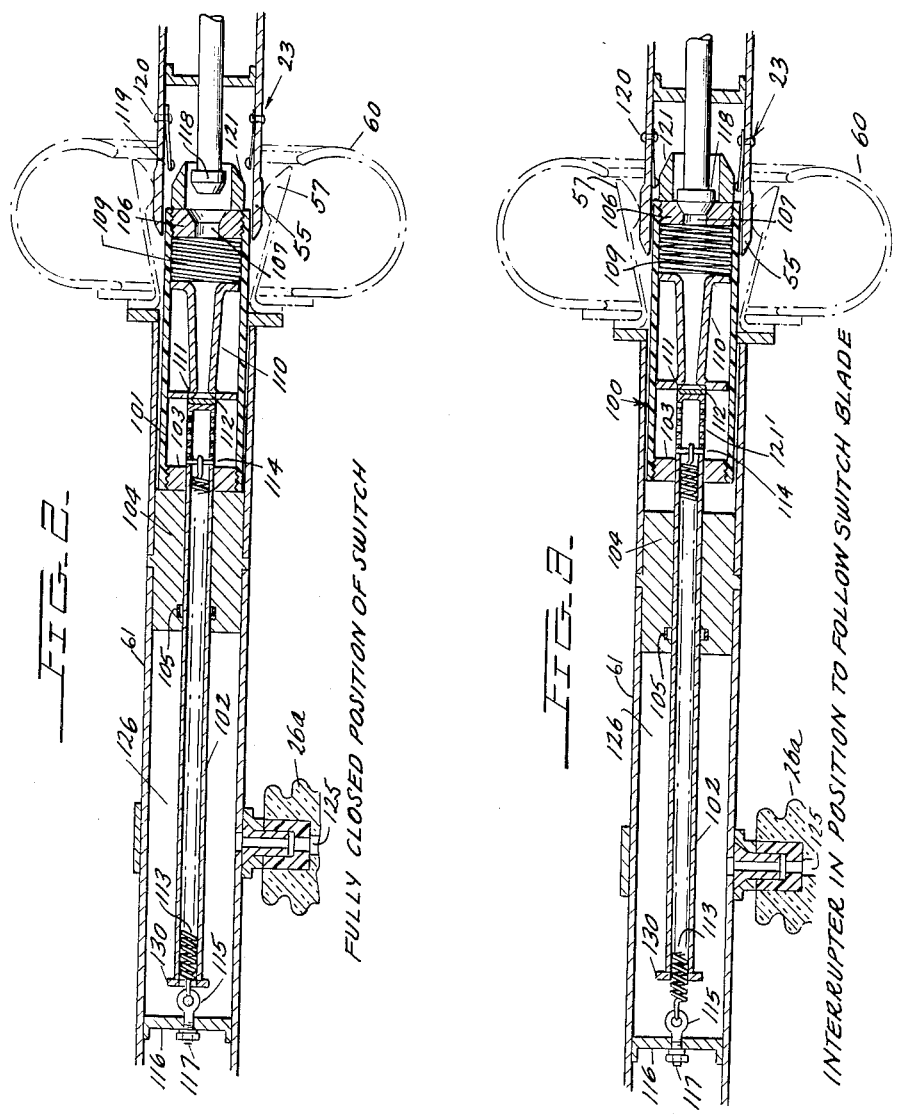

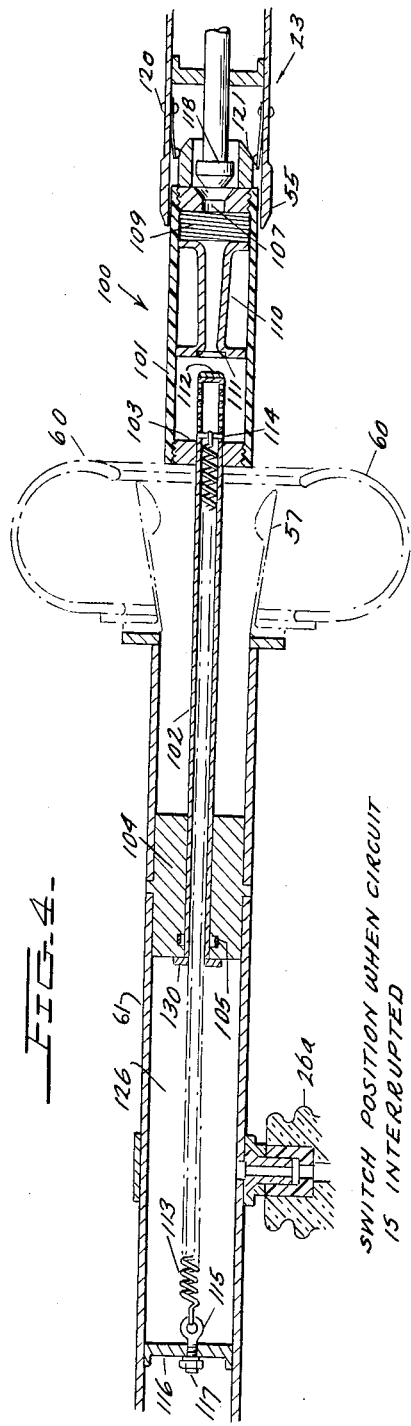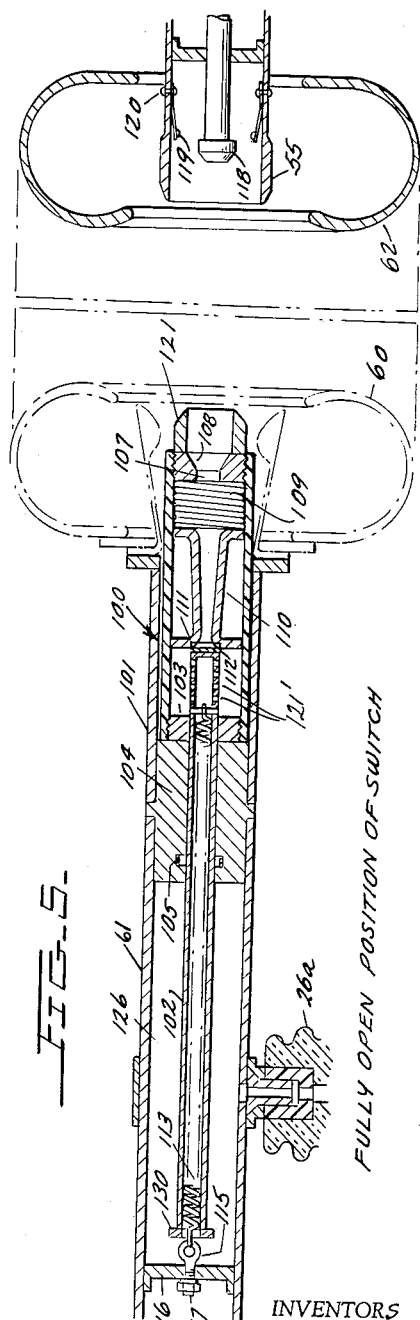

United States Patent Office 2,978,560
Patented Apr. 4, 1961

2,978,560
INTERRUPTER UNIT FOR TELESCOPING BLADE SWITCH

Arthur C. Bates and Robert C. Crowe, Greensburg, Pa., assignors to I-T-E Circuit Breaker Company, Philadelphia, Pa., a corporation of Pennsylvania Filed Mar. 20, 1958, Ser. No. 722,753

16 Claims. (Cl. 200—148)

This application generally relates to a disconnect switch of the telescoping blade type utilized for a high voltage isolated phase bus and more particularly to a telescoping blade switch having a pneumatically operated interrupter unit incorporated therein.

An isolated phase bus disconnecting switch, which is to be operated when the load is disconnected but circuit voltage is present, is called upon to make or interrupt the charging current of that portion of the circuit between disconnect switch and the point where the load was disconnected. If the load interrupting device is a circuit breaker, the charging curent is increased by the charging current of the circuit breaker bushings and other parts of the circuit breaker. Because of the very limited ability of the ordinary slow moving bus disconnecting switch to interrupt charging currents, it is desirable to keep charging currents low by minimizing circuit lengths and minimizing equipment that augments the charging current. Arcing during opening of the bus disconnect switch partially ionizes the insulating fluid or gas in the space enclosed by the bus housing which lowers the dielectric properties of this fluid thereby increasing the chances of flashover between the housing and bus conductor. The longer or more severe the arcing the greater is the hazard of flashover.

Limiting the charging current by the methods described in the preceding paragraph is often not convenient or economical. It may be desirable to have the bus directly connected to the transformer and have the load disconnecting circuit breaker on the secondary side of the transformer. Under such a condition the bus disconnect switch is called upon to make and break the charging current of the section of bus between the disconnect switch and the transformer and the charging current of the circuit breaker as reflected through the transformer, as well as the transformer magnetizing current. Such a requirement means that the isolated phase bus disconnect switch must include a special provision for the effective interruption of the combined charging and magnetizing current in the circuit.

The disconnect switch of the instant invention provides a reliable and economical interrupting means while at the same time maintaining small size and dielectric performance as well as other desirable properties of existing isolated phase bus disconnect switches. Our disconnect switch comprises a disconnect switch of the telescoping blade type and an interrupter unit mounted coaxially therewith. The interrupter unit is pneumatically operated and is entirely disposed within the tubular elements of the bus or switch blade at all times except when the switch is in the act of being opened or closed. Even during the opening and closing operations, the interrupter unit occupies the most advantageous axial position and is disconnected from the circuit except during opening and closing. Because of this, the interrupter unit does not disturb the dielectric properties of the switch in the open and closed positions.

Opening of a switch which is mounted to a bus section, is accomplished by moving the switch blade along its longitudinal axis and at the same time introducing high pressure gas will cause the interrupter unit to emerge from the bus section and follow the receding switch blade for a substantial distance until such time as axial movement of the interrupter unit is arrested. At this time, the gas pressure will force apart a pair of interrupting contacts, included as part of the interrupter unit, thereby interrupting the circuit.

As the interrupting contacts are being parted, gas at high pressure flows between the part contacts and exhausts the arcing products along the longitudinal axis of the isolated phase bus. The high pressure gas cools the arc products thereby bringing about a rapid deionization thereof which assists in arc interruption and also results in the arcing products having negligible deleterious effect upon air in the space between the bus bar and housing of the bus structure. After circuit interruption the interrupter unit is disconnected from the high pressure gas supply and a retrieving spring draws the interrupter unit back within the bus conductor thereby presenting the same open gap as without the interrupter unit being present.

As the switch blade is moved from the opened circuit to the closed circuit position, high pressure gas is introduced to the interrupter unit thereby extending the interrupter unit to a predetermined position to be met by the advancing switch blade or else extending the interrupter unit until it contacts the advancing switch blade. Thereafter contact biasing spring means within the interrupter unit is effective to readily close the interrupting contacts thereby closing the circuit. When the switch blade has reached the fully closed position, the supply of high pressure gas is disconnected from the interrupter unit and the retrieving spring is then effective to separate the interrupting contacts so that the interrupting contacts will not carry any load current.

Accordingly, a primary object of the instant invention is to provide a novel disconnect switch which utilizes gas pressure for bringing about contact separation as well as arc extinction.

Another object is to provide a novel pneumatically operated interrupter unit mounted coaxially with a telescoping type blade switch.

Still another object is to provide a telescoping type blade switch for a high voltage isolated phase bus including a pneumatically operated interrupting unit which is completely disposed within the bus at all times except when the disconnect switch is actually being operated.

A further object is to provide a pneumatically operated interrupter unit to be utilized with a telescoping blade switch which will not alter the electro-static field as established between the movable and stationary parts of the ordinary telescoping type blade switch that does not include an interrupter unit.

A still further object is to provide a pneumatically operated disconnect switch for a high voltage isolated phase bus which requires a minimum of axial length and is mounted within a housing having the same diameter as the housing of the isolated phase bus.

These as well as other objects of the instant invention shall readily become apparent upon reading the following description of the accompanying drawings in which:

Figure 1 is a longitudinal cross-section of an isolated phase bus disconnect switch mounted between two sections of isolated phase bus.

Figures 2–5 are longitudinal sections of the disconnect switch illustrating the positions of the interrupter unit mechanism as the telescoping switch blade is moved between the closed and open positions. In Figure 2 the switch is in the fully closed position. In Figure 3 the interrupter unit has just begun to follow the switch blade. In Figure 4 the interrupting contacts of the interrupting unit have just been parted. In Figure 5 the disconnect switch is in the fully opened position with the air supply having been shut off.

Referring to the figures, disconnect switch 15, illustrated in detail in Figures 2–5, is shown in Figure 1 as being interposed between sections 16 and 17 of isolated phase bus. Each isolated phase bus section 16, 17 is of the conventional type fully described in U.S. Patent #2,469,445 and comprises a hollow bus bar 18 centered in metallic housing 19 of circular cross-section by means of three insulators 20.

Disconnect switch 15 comprises a jaw structure 21 mounted on the hollow bus bar 18 of bus section 16, a contact structure 22 mounted on the hollow bus bar 18 of bus section 17, a movable blade 23 which is slidably mounted to contact structure 22 for telescoping therewith, and an interrupter unit 100 operatively mounted within bus bar 18 of bus section 16. Jaw structure 21, contact structure 22 and blade 23 are described in detail in the R. H. Albright copending application Serial No. 705,269 filed December 26, 1957, now Patent No. 2,889,436 entitled "Telescoping Blade Switch in a circular Housing," and assigned to the assignee of the instant invention. Therefore, the description thereof shall be limited to bare essentials.

Jaw structure 21 and contact structure 22 are positioned in axial alignment with a gap therebetween which is bridged by blade 23 when disconnect switch 15 is in the closed position of Figure 2. Jaw structure 21 is positioned within disconnect switch housing 25 by means of a plurality of radially projecting fixed insulators 26 one of which 26a being hollow for a purpose to be hereinafter explained. Contact structure is positioned within housing 25 by means of a plurality of radially projecting fixed insulators 27 and a single rotatable insulator 28, the purpose of which shall be hereinafter explained.

Switch housing 25 is of circular cross-section and of the same diameter as the housing 19 of the isolated phase bus run with which disconnect switch 15 is associated. Notched flange members 29 are welded or otherwise secured to switch housing 25 at each end thereof and butt against similarly notched flange members 30 welded or otherwise secured to the bus housing 19. A suitable ring clamp (not shown) is utilized to secure the bus and switch housings 19, 25 to one another.

Contact structure 22 includes an elongated housing 31 inside of which concave rollers 32 are rotatably mounted. Rollers 32 are provided since the great weight of blade 23 makes a sliding bearing contact impractical. Secured to housing 31, externally thereof, are resilient contact fingers (not shown) which extend through openings in housing 31 into wiping contact with blade 23.

A rack 80 is secured to the inside of blade 23 and is operatively engaged by pinion 43 which is mounted on shaft 44. Shaft 44 is secured to rotatable insulator 28, which extends from contact structure housing 31 to disconnect switch housing 25. Rotatable insulator 28 is of substantially the same shape as the insulators 20 of the isolated phase bus. A stub shaft 50 extends axially from the housing end of rotatable insulator 28 and is connected to the output shaft 51 of gear box 52 through which driving power is transmitted to disconnect switch 15. Rotation of insulator 28 will cause rotation of pinion 43. Since pinion 43 is meshed with rack 80, rotation of pinion 43 brings about movement of switch blade 23, which is secured to rack 40, along its longitudinal axis.

In the circuit closed position of Figure 2 the end 55 of switch blade 23 is engaged by the plurality of circularly arranged contacts 57 which form jaw 56. Contacts 57 are biased radially inward when they engage the outer surface of blade 23 either because they are resilient members or because of a separate biasing means such as a garter spring (not shown). Corona shields 58—60, of C-shaped cross-section, are secured to hollow cylindrical member 61 of jaw structure 21 at strategic locations thereof while corona shields 62—64, each of C-shaped cross-section, are secured to contact structure housing 31. Window 99 in switch housing 25 is located opposite the gap between contact structure 17 and jaw structure 16 so that the position of blade 23 may be readily ascertained.

Interrupting unit 100 comprises a cylindrical insulating housing 101 slidably disposed within cylindrical member 61 which is secured to the right end of bus conductor 18 of isolated phase bus section 16. Tube 102 is entered through a central opening in one end closure member 103 of housing 101. Tube 102 also passes through a central opening in conducting block 104 which occupies the space between the outside of tube 102 and the inside bus conductor 18. A plurality of spring contacts 105 are disposed within a cut out of block 104 and bear against block 104 and the outside surface of tube 102 thereby assuring good electrical contact therebetween. Another closure member 106 is mounted at the other end of housing 101 and includes a central opening 107 partially defined by an inclined valve seat 108.

A contact biasing spring 109, preferably comprised of beryllium copper, bears against closure member 106 and one end of blast nozzle 110 which is slidably disposed within housing 101 in the manner of a piston mounted within a cylinder. The other end of blast nozzle 110 is provided with an interrupting contact 111 which cooperates with an interrupting contact 112 mounted to one end of tube 102. A retrieving spring 113 is secured to tube 102 at cross member 114 and to bus conductor 18 at eye member 115 which is secured to baffle 116 by means of fastener 117. Retrieving spring 113 biases the entire interrupter unit 100 to the left with respect to Figure 2 for a reason to be hereinafter explained.

Switch blade 23 is provided with a plug 118 secured thereto, disposed therein, and arranged coaxially therewith. A plurality of auxiliary contacts 119 are secured to switch blade 23 by means of rivets 120 and are circumferentially arranged along the inside surface of switch blade 23.

The operation of disconnect switch 15 will now be described. Starting with disconnect switch 15 in the closed position of Figure 2, switch blade 23 is moved to the right through rotation of insulator 28. As switch blade 23 moves to the right, an external control means is operated to introduce high pressure gas through passageway 125 of hollow insulator 26a into chamber 126 formed in bus conductor 18 between baffle 116 and conducting block 104. The high pressure gas forces tube 102 as well as the other members of interrupter unit 100 to the right so that plug 118 becomes mated with seat 108. During this interval it is permissible for the interrupting contacts 111, 112 to separate since they are shunted by the main contacts 57, 23 of disconnect switch 15.

In the partially ejected position of Figure 3 interrupter unit 100 is in engagement with the retreating switch blade 23 and plug 118 closes the discharge opening 107. Auxiliary contacts 119 engage extension 121 of closure member 106 so that main contacts 57, 23 are now paralleled by the connection between auxiliary contacts 119, extension 121, closure member 106, spring 109, nozzle member 110, cooperating interrupting contacts 111, 112, tube 102, spring contacts 105 and conducting block 104. Closing of discharge opening 107 makes it possible for contact biasing spring 109 to assure that the interrupting contacts 111, 112 are engaged.

Continued rotation of insulator 28 moves switch blade 23 further to the right and the high pressure gas causes interrupter unit 100 to flow and remain in contact with switch blade 23 until the flange 130 at the end of tube 102 prevents a further extension of interrupter unit 100 since closure member 103 is rigidly secured to tube 102. In this extended position interrupter unit 100 is ready to interrupt the circuit and further movement of switch blade 23 causes plug 118 to leave seat 108 so that discharge opening 107 is no longer closed.

The release of gas pressure at the right end of interrupter unit 100 causes blast nozzle 110 to move to the right thereby rapidly separating interrupting contacts 111, 112 (Figure 4) at the nozzle 110. The high gas pressure is converted to high velocity and ionized gases are swept down nozzle 110 to discharge the arcing products while a fresh supply of gas under pressure passes through side vents 121' thereof, into the space between the parted interrupting contacts 111, 112. In this manner a fresh supply of gas under high pressure is available to create a high dielectric strength in the relatively short distance between the parted interrupting contacts 111, 112. Thus the arc is readily extinguished and the ionizing products of arcing are carried down tubular switch blade 23 where, by turbulent mixing, radiation and contact with the cold metallic parts of switch 15, the ionization is greatly decreased before the gas is vented to the space between conductor 18 and housing 19.

After sufficient separation between blade 23 and interrupter unit 100, and before the switch blade 23 is fully opened, the supply of high pressure gas is cut off and spring 113 retrieves interrupter unit 100 into the left hand bus conductor 18 (Figure 5). In the fully opened position of disconnect switch 115, none of the parts of interrupter unit 100 are in the electric field existing between switch blade 23 and jaw structure 21. Therefore, the interrupter unit 100 does not adversely or otherwise affect the dielectric characteristics of disconnect switch 15 as compared to the ordinary telescoping type disconnect switch.

In order to close disconnect switch 15 insulator 28 is rotated in the reverse direction so that switch blade 23 advances from right to left until it reaches a suitable position at which time the external control means is operated to permit high pressure gas to be admitted into chamber 126. The high pressure gas causes interrupter contacts 111, 112 to separate and also extends the interrupter unit 100 from the left bus conductor 18. Continued rotation of insulator 28 brings the moving switch blade 23 into engagement with the extended interrupter unit 100 with the auxiliary contacts 119 engaging extension 121 and shortly thereafter plug 118 blocks discharge opening 107 to end the gas discharge therethrough. The termination of gas discharge permits closing spring 109 to move blast nozzle 110 to left thereby bringing about the rapid engagement of interrupting contacts 111, 112 which establishes a complete electrical path through interrupter unit 100.

As switch blade 23 continues to advance to the left, it forces interrupter unit 100 to the left back into bus conductor 18. As the main contacts 57, 23 become engaged, the external control means causes the high pressure gas supply to be disconnected from chamber 126 thereby permitting retrieving spring 113 to move interrupter unit 100 to the left to disengage the auxiliary contact 119 thereby cutting the interrupter unit 100 out of the circuit. In the fully closed position of Figure 2 all of the interrupter unit parts are disposed completely within bus conductor 18 and are also electrically disconnected from the circuit so that interrupter unit 100 in no way affects the dielectric current carrying characteristics of disconnect switch 15.

While the embodiment of this invention hereinbefore described included an interrupter unit mounted to a stationary bus conductor it should be apparent to those skilled in the art that the interrupter unit is readily adaptable for mounting in the switch blade with the plug and auxiliary contacts being mounted on the bus conductor.

It should also be apparent to those skilled in the art that switch of the instant invention may be automatically controlled by the movement of a single operating handle which can be interlocked to assure a proper gas supply before operation.

Thus we have provided a novel disconnect switch for high voltage isolated phase bus which is enclosed in a circular housing, having the same diameter as the bus housing, which is of short axial length. The disconnect switch is partially gas operated thereby reducing the contact separation time to a minimum and making the switch length determined by the distance required for external flashover rather than that required for internal stroke and gap.

Although we have here described preferred embodiments of our novel invention, many variations and modifications will now be apparent to those skilled in the art, and we therefore prefer to be limited, not by the specific disclosure herein, but only by the appending claims.

We claim:

1. An electric switch comprising a first structure, a second structure, a blade; said structures being fixed in axial alignment with a gap therebetween; said blade being disposed within said first structure and slideable along the axis thereof; said switch having a closed position wherein said gap is bridged by said blade and an open position wherein said gap is open; a pneumatically operated interrupter means mounted to and disposed within either said second structure or said blade and arranged coaxially therewith; said interrupter means having a portion axially extendable from the member to which said interrupter is mounted into said gap during operation of said switch to both its open and closed positions; said portion being withdrawn from said gap after said switch is fully opened.

2. An electric switch comprising a first structure, a second structure, a blade; said structures being fixed in axial alignment with a gap therebetween; said blade being disposed within said first structure and slideable along the axis thereof; said switch having a closed position wherein said gap is bridged by said blade and an open position wherein said gap is open; an interrupter means disposed within either said second structure or said blade in axial alignment therewith; said interrupter means having a portion axially extendable from the member to which said interrupter is mounted into said gap during operation of said switch to both its open and closed positions; said portion being withdrawn from said gap after said switch is fully opened; said interrupter means also including a pair of cooperating contacts operatively connected to interrupt the circuit between said first and said second structures.

3. An electric switch comprising a first structure, a second structure, a blade; said structures being fixed in axial alignment with a gap therebetween; said blade being disposed within said first structure and slideable along the axis thereof; said switch having a closed position wherein said gap is bridged by said blade and an open position wherein said gap is open; pneumatically operated means disposed within either said second structure or said blade when said switch is in said open and said closed positions; said means being partially ejected into said gap by the action of gas pressure while said switch is being operated to both said open and said closed positions; said means being withdrawn from said gap when said switch is in its fully closed position.

4. An electric switch comprising a first structure, a second structure, a blade; said structures being fixed in axial alignment with a gap therebetween; said blade being disposed within said first structure and slideable along the axis thereof; said switch having a closed position wherein said gap is bridged by said blade and an open position wherein said gap is open; a pneumatically operated interrupter means slidably disposed in axial alignment with said blade; said interrupter means being entirely disposed within said second structure when said switch is in both said open and said closed positions; said interrupter means being partially ejected from said second structure across only a portion of the gap while the switch is being operated to both its said open and said closed positions.

5. An electric switch comprising a first structure, a second structure, a blade; said structures being fixed in axial alignment with a gap therebetween; said blade being disposed within said first structure and slideable along the axis thereof; said switch having a closed position wherein said gap is bridged by said blade and an open position wherein said gap is open; an interrupter means including a pair of interrupting contacts slidably mounted within said second structure and positioned in axial alignment with said blade; a first end of said interrupter means being connectible to a source of high pressure gas; said interrupter means being connected to said source upon initial movement of said blade from said closed to said open position; said high pressure gas ejecting a second end of said interrupter means from said second structure into engagement with said blade; means to limit the outward travel of said interrupter means to a first position; said high pressure gas being effective to separate said pair of interrupting contacts when said interrupter means reaches said first position while said switch is being operated from said closed to said open position.

6. An electric switch comprising a first structure, a second structure, a blade; said structures being fixed in axial alignment with a gap therebetween; said blade being disposed within said first structure and slideable along the axis thereof; said switch having a closed position wherein said gap is bridged by said blade and an open position wherein said gap is open; an interrupter means including a pair of interrupting contacts slidably mounted within said second structure and positioned in axial alignment with said blade; a first end of said interrupter means being connectible to a source of high pressure gas; said interrupter means being connected to said source upon initial movement of said blade from said closed to said open position; said high pressure gas ejecting a second end of said interrupter means from said second structure into engagement with said blade; means to limit the outward travel of said interrupter means to a first position; said high pressure gas being effective to separate said pair of interrupting contacts when said interrupter means reaches said first position while said switch is being operated from said closed to said open position; biasing means operatively connected to said interrupter means to return said interrupter means within the confines of said second structure when said interrupter means is disconnected from said source of high pressure gas.

7. An electrical switch comprising a first structure, a second structure, a blade; said structures being fixed in axial alignment with a gap therebetween; said blade being disposed within said first structure and sideable along the axis thereof; said switch having a closed position wherein said gap is bridged by said blade in an open position wherein said gap is open; an interrupter means including a pair of interrupting contacts slidably mounted within said second structure and positioned in axial alignment with said blade; a first end of said interrupter means being connectible to a source of high pressure gas; said interrupter means being connected to said source upon initial movement of said blade from said closed to said open position; said high pressure gas ejecting a second end of said interrupter means from said second structure into engagement with said blade; means to limit the outward travel of said interrupter means to a first position; said high pressure gas being effective to separate said pair of interrupting contacts when said interrupter means reaches said first position while said switch is being operated from said closed to said open position; a passage extending from said first end to said second end of said interrupter means; said passage being blocked when said interrupting contacts are engaged; a plug secured to said blade and positionable to close said passage at said second end; said passage being partially defined by a nozzle member which carries a first of said pair of interrupting contacts; biasing means acting on said nozzle member urging said pair of cooperating contacts into engagement.

8. An electrical switch comprising a first structure, a second structure, a blade; said structures being fixed in axial alignment with a gap therebetween; said blade being disposed within said first structure and slideable along the axis thereof; said switch having a closed position wherein said gap is bridged by said blade and an open position wherein said gap is open; an interrupter means including a pair of interrupting contacts slidably mounted within said second structure and positioned in axial alignment with said blade; a first end of said interrupter means being connectible to a source of high pressure gas; said interrupter means being connected to said source upon initial movement of said blade from said closed to said open position; said high pressure gas ejecting a second end of said interrupter means from said second structure into engagement with said blade; means to limit the outward travel of said interrupter means to a first position; said high pressure gas being effective to separate said pair of interrupting contacts when said interrupter means reaches said first position while said switch is being operated from said closed to said open position; a passage extending from said first end to said second end of said interrupter means; said passage being blocked when said interrupting contacts are engaged; a plug secured to said blade and positionable to close said passage at said second end; said passage being partially defined by a nozzle member which carries a first of said pair of interrupting contacts; biasing means acting on said nozzle member urging said pair of cooperating contacts into engagement; a plurality of circularly arranged auxiliary contacts disposed within said blade and secured thereto; said auxiliary contacts being in engagement with said interrupter means after said source of high pressure gas is connected to said interrupter means and while said interrupter means is moving to said first position.

9. An electric switch comprising a first structure, a second structure, a blade; said structures being fixed in axial alignment with a gap therebetween; said blade being disposed within said first structure and slideable along the axis thereof; said switch having a closed position wherein said gap is bridged by said blade and an open position wherein said gap is open; an interrupter means including a pair of interrupting contacts slidably mounted within said second structure and positioned in axial alignment with said blade; a first end of said interrupter means being connectible to a source of high pressure gas; said interrupter means being connected to said source upon initial movement of said blade from said closed to said open position; said high pressure gas ejecting a second end of said interrupter means from said second structure into engagement with said blade; means to limit the outward travel of said interrupter means to a first position; said high pressure gas being effective to separate said pair of interrupting contacts when said interrupter means reaches said first position while said switch is being operated from said closed to said open position; a passage extending from said first end to said second end of said interrupter means; said passage being blocked when said interrupting contacts are engaged; a plug secured to said blade and positionable to close said passage at said second end; said passage being partially defined by a nozzle member which carries a first of said pair of interrupting contacts; biasing means acting on said nozzle member urging said pair of cooperating contacts into engagement; said high pressure gas being effective to part said interrupting contacts and to eject said interruper means second end beyond the confines of said second structure to said first position upon initial movement of said blade from said switch open position to said switch closed position; continued movement of said blade causing said plug to seal off said passage at said interrupter means second end and thereby permit said biasing means to bring said interrupting contacts into engagement.

10. An electric switch comprising a first structure, a second structure, a blade; said structures being fixed in axial alignment with a gap therebetween; said blade being disposed within said first structure and slideable along the axis thereof; said switch having a closed position wherein said gap is bridged by said blade and an open position wherein said gap is open; an interrupter means including a pair of interrupting contacts slidably mounted within said second structure and positioned in axial alignment with said blade; a first end of said interrupter means being connectible to a source of high pressure gas; said interrupter means being connected to said source upon initial movement of said blade from said closed to said open position; said high pressure gas ejecting a second end of said interrupter means from said second structure into engagement with said blade; means to limit the outward travel of said interrupter means to a first position; said high pressure gas being effective to separate said pair of interrupting contacts when said interrupter means reaches said first position while said switch is being operated from said closed to said open position; a passage extending from said first end to said second end of said interrupter means; said passage being blocked when said interrupting contacts are engaged; a plug secured to said blade and positionable to close said passage at said second end; said passage being partially defined by a nozzle member which carries a first of said pair of interrupting contacts; biasing means acting on said nozzle member urging said pair of cooperating contacts into engagement; said high pressure gas being effective to part said interrupting contacts and to eject said interrupter means second end beyond the confines of said second structure to said first position upon initial movement of said blade from said switch open position to said switch closed position; continued movement of said blade causing said plug to seal off said passage at said interrupter means second end and thereby permit said biasing means to bring said interrupting contacts into engagement; a tube carrying a second of said pair of interrupting contacts; a retrieving means connected between said tube and said second structure; said retrieving means being effective to move said interrupter means within the confines of said second structure when said interrupter unit is disconnected from said source of high pressure gas.

11. An interrupting means adaptable for use with a disconnect switch of the telescoping blade type; said interrupting means comprising an axially movable insulating tubular housing, a first and a second closure member secured to the respective ends of said housing; said first and said second closure members having a first and a second opening respectively therethrough, an elongated tube secured to said first closure member and having a first end thereof entered into said housing through said first opening, a nozzle means slidably disposed within said housing and a pair of cooperating contacts; a first contact of said cooperating contacts being secured to said tube first end; a second contact of said cooperating contacts being secured to said nozzle means.

12. An interrupting means adaptable for use with a disconnect switch of the telescoping blade type; said interrupting means comprising an axially movable insulating tubular housing, a first and a second closure member secured to the respective ends of said housing; said first and said second closure members having a first and a second opening respectively therethrough, an elongated tube secured to said first closure member and having a first end thereof entered into said housing through said first opening, a nozzle means slidably disposed within said housing and a pair of cooperating contacts; a first contact of said cooperating contacts being secured to said tube first end; a second contact of said cooperating contacts being secured to said nozzle means; biasing means disposed within said housing and operatively positioned to urge said second contact into engagement with said first contact.

13. An interrupting means adaptable for use with a disconnect switch of the telescoping blade type; said interrupting means comprising an axially movable insulating tubular housing, a first and a second closure member secured to the respective ends of said housing; said first and said second closure members having a first and a second opening respectively therethrough, an elongated tube secured to said first closure member and having a first end thereof entered into said housing through said first opening, a nozzle means slidably disposed within said housing and a pair of cooperating contacts; a first contact of said cooperating contacts being secured to said tube first end; a second contact of said cooperating contacts being secured to said nozzle means; biasing means disposed within said housing and operatively positioned to urge said second contact into engagement with said first contact; said tube having side vents in the portion thereof positioned within said housing.

14. An interrupting means adaptable for use with a disconnect switch of the telescoping blade type; said interrupting means comprising an axially movable insulating tubular housing, a first and a second closure member secured to the respective ends of said housing; said first and said second closure members having a first and a second opening respectively therethrough, an elongated tube secured to said first closure member and having a first end thereof entered into said housing through said first opening, a nozzle means slidably disposed within said housing and a pair of cooperating contacts; a first contact of said cooperating contacts being secured to said tube first end; a second contact of said cooperating contacts being secured to said nozzle means; biasing means disposed within said housing and operatively positioned to urge said second contact into engagement with said first contact; said second closure member having an extension extending beyond the confines of said housing; said extension being adapted for engagement by auxiliary contacts carried by a blade of said switch.

15. An interrupting means adaptable for use with a disconnect switch of the telescoping blade type; said interrupting means comprising an axially movable insulating tubular housing, a first and a second closure member secured to the respective ends of said housing; said first and said second closure members having a first and a second opening respectively therethrough, an elongated tube secured to said first closure member and having a first end thereof entered into said housing through said first opening, a nozzle means slidably disposed within said housing and a pair of cooperating contacts, a first contact of said cooperating contacts being secured to said tube first end; a second contact of said cooperating contacts being secured to said nozzle means; biasing means disposed within said housing and operatively positioned to urge said second contact into engagement with said first contact; a retrieving means disposed within and secured to said tube.

16. An electric switch comprising a first structure, a second structure, a blade; said structures being fixed in axial alignment with a gap therebetween; said blade being disposed within said first structure and slideable along the axis thereof; said switch having a closed position wherein said gap is bridged by said blade and an open position wherein said gap is open; a high pressure gas operated interrupter means disposed within either said second structure or said blade and arranged coaxially therewith; said means being partially ejected into said gap by the action of gas pressure while the switch is being operated from open to closed position; said means being withdrawn from said gap when said switch is in its fully closed position.

References Cited in the file of this patent

UNITED STATES PATENTS

| | | |
|---|---|---|
| 1,067,735 | Hewlett | July 15, 1913 |
| 2,280,321 | Thommen | Apr. 21, 1942 |
| 2,481,996 | Grunewald et al. | Sept. 13, 1949 |
| 2,679,567 | Kradel | May 25, 1954 |

FOREIGN PATENTS

| | | |
|---|---|---|
| 295,226 | Germany | Nov. 13, 1916 |
| 607,466 | Germany | Jan. 3, 1935 |
| 451,431 | Great Britain | Aug. 6, 1936 |
| 638,145 | Germany | Nov. 10, 1936 |
| 704,181 | Germany | Mar. 25, 1941 |
| 531,567 | Belgium | Sept. 30, 1954 |